(12) United States Patent
Nishimaki

(10) Patent No.: US 6,927,986 B2
(45) Date of Patent: Aug. 9, 2005

(54) POWER SUPPLY AND PWM CIRCUITS

(75) Inventor: Tatsuo Nishimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 10/400,167

(22) Filed: Mar. 26, 2003

(65) Prior Publication Data
US 2003/0214272 A1 Nov. 20, 2003

(30) Foreign Application Priority Data
Mar. 26, 2002 (JP) .................................. 2002-087128

(51) Int. Cl.$^7$ .................. H02M 3/335; G05F 1/40
(52) U.S. Cl. .................. 363/26; 363/37; 323/272; 323/287
(58) Field of Search .................. 323/267, 222, 323/282, 283, 284, 285, 272; 363/97, 95, 41, 131, 67, 86, 21.12, 65

(56) References Cited

U.S. PATENT DOCUMENTS

| 5,146,601 | A | * | 9/1992 | Hosaka et al. | ............... 713/501 |
| 6,016,075 | A | * | 1/2000 | Hamo | ................ 330/10 |
| 6,430,070 | B1 | * | 8/2002 | Shi et al. | ................ 363/97 |
| 6,628,110 | B2 | * | 9/2003 | Zafarana et al. | ............ 323/284 |

FOREIGN PATENT DOCUMENTS

| JP | 06-225522 | * | 8/1994 |
| JP | 09-023640 | | 1/1997 |
| JP | 2002-009596 | | 1/2002 |
| JP | 2002-064975 | | 2/2002 |

* cited by examiner

Primary Examiner—Rajnikant B. Patel
(74) Attorney, Agent, or Firm—Hogan & Hartson, LLP

(57) ABSTRACT

A PWM circuit is provided that is capable of PWM control with duties in a range of 0–100%, and that is also capable of high-speed responses.

17 Claims, 6 Drawing Sheets

POWER SUPPLY AND PWM CIRCUITS

BACKGROUND

The present invention relates to power supply circuits and PWM circuits.

Mobile equipment such as mobile telephones have become popular in recent years, and there are an increasing number of occasions in which circuits in the equipment are loads are driven by batteries. In such cases, lower power consumption at the power supply circuit is desirable. It may also be desirable for power supply circuits to be able to respond to load changes at high speeds.

As the electronic equipment that uses integrated circuits has become popular, stable DC power supplies with low voltage and low power consumption are required.

If transistors are switched on and off in synchronism with changes in the loads and inputs to stabilize the power supply, waste power consumption can be reduced. Therefore, the efficiency of the power supply can be substantially improved. In other words, the power supply can be stabilized by changing on-periods (or on-duty) of the transistors. Synchronous rectification type switching regulators using CMOS integrated circuits are known as such efficient power supply circuits.

CMOS integrated circuits are formed by combining two kinds of MOS transistors, i.e., an N-channel transistor (hereafter simply referred to as an "NMOS") and a P-channel transistor (hereafter simply referred to as a "PMOS"). Because of their low power consumption characteristic, they has become the mainstream of LSI technology.

FIG. 7 shows a structure of a synchronous rectification type switching regulator using a CMOS integrated circuit.

Referring to FIG. 7, a power supply circuit is composed of a synchronous rectification type switching regulator circuit that includes a PMOS on a high side (hereafter referred to as an "upper transistor") (QP1) and an NMOS on a low side (hereafter referred to as a "lower transistor") (QN1), which are alternately turned on and off to output a DC voltage VOUT, an error amplifier 40 that compares the output voltage of the C switching regulator circuit with a reference voltage value of a reference voltage source E to obtain an error signal, and a PWM circuit 20 that controls outputs of the switching regulator circuit to be constant by controlling the pulse width of a PWM signal based on the error signal.

The switching regulator circuit has the upper transistor (QP1) and the lower transistor (QN1) serially connected to each other with their drains D being shared between a terminal 1 that is provided with a DC voltage VIN (=a power supply voltage VDD, which is, for example, 4V) as an input voltage and a terminal 2 that is given a reference potential VSS (=a ground potential GND, which is, for example, 0V). A source S of the upper transistor (QP1) connects to the terminal 1, and a source of the lower transistor (QN1) connects to the terminal 2.

High frequency pulses SH and SL, which are obtained by inverting a PWM signal from the PWM circuit 20 by output buffers BA1 and BA2, respectively, are supplied to gates of the upper transistor (QP1) and the lower transistor (QN1), respectively. The transistors are alternately turned on and off by the high frequency pulses SH and SL to thereby generate an AC voltage VMA at an intermediate node K that is a connection point of the two transistors.

A rectification coil L1 and a stabilizing capacitor CO are serially connected between the node K and a terminal 3 that provides the reference voltage VSS; and a DC voltage VOUT that is smoothed out by the stabilizing capacitor CO is outputted from an output terminal 4 that is connected to the serially connected point. Then, the output voltage VOUT is returned to a minus (−) terminal of the error amplifier 40 through a feed back line, and compared with the reference voltage value of the reference voltage source E that is connected to a terminal 5 that gives the reference potential VSS. An error output Vb which is a comparison result given by the error amplifier 40 is supplied to the PWM circuit 20, and the pulse width of the PWM signal generated by the PWM circuit 20 is controlled by the error output. By this feed back control, the output voltage VOUT (for example, 1.5V) to be supplied to a load (not shown) is always controlled to be constant.

Conventionally, the PWM circuit 20 is composed of, for example, a comparator COMP as shown in FIG. 8. The error output Vb (see FIG. 9(a)) of the error amplifier 40 is inputted in a minus (−) terminal of the comparator COMP as a reference signal, and a triangular waveform signal Vsaw (see FIG. 9(a)) that is generated by a triangular waveform generation circuit not shown is inputted in a plus (+) terminal of the comparator COMP. As a result of the comparison, a PWM signal (see FIG. 9(b)) whose pulse width changes according to the error output Vb is outputted. The PWM signal is supplied to the upper transistor (QP1) and the lower transistor (QN1) shown in FIG. 7 as gate pulses SH and SL, respectively. However, the gate pulse SL that is supplied to the lower transistor (QN1) is formed to have a pulse width slightly narrower than that of the gate pulse SH supplied to the upper transistor (QP1) such that a through current does not flow from the power supply voltage VIN side to the reference potential VSS side if the PMOS and NMOS simultaneously turn on.

However, when the PWM circuit is formed from a comparator, and the frequency of the triangular waveform signal is set to a high frequency of, for example, about 1 MHz to have the CMOS converter circuit switch at high speeds, it is difficult to generate a PWM signal according to the high frequency and it is difficult to achieve higher speeds.

In view of the above, it has been conceived that the PWM circuit 20 may generate a PWM signal having a pulse width according to an error output Vb through creating a triangular waveform signal having a slope according to the error output Vb from a reference clock of a predetermined frequency (for example, 1 MHz), and supplying the triangular waveform signal to a potential judging circuit such as a Schmitt trigger circuit.

The PWM circuit 20 is composed as shown in FIG. 10, for example. As shown, the PWM circuit 20 includes a clock input terminal 21 that is supplied with a reference clock CLK of, for example, 1 MHz (see FIG. 11(a)); a power supply input terminal 22 that is supplied with an input voltage VIN as a power supply voltage; an input terminal 23 in which an error output Vb from the error amplifier 40 is inputted; a reference potential input terminal 24 that is given a reference potential VSS; a voltage-current converter circuit having an error amplifier 201, a reference resistance R and a current control PMOS (QP2) wherein the error output Vb is inputted in a minus (−) terminal of the error amplifier 201, a plus (+) terminal of the error amplifier 201 is connected to a serial connection point between a drain of the PMOS (QP2) and the reference resistance R, an output terminal of the error amplifier 201 is connected to a gate of the PMOS (QP2), a source of the PMOS (QP2) is connected to the power supply input terminal 22, and one end of the reference resistance R is connected to the reference potential input terminal 24; a charge-discharge circuit having a current supply PMOS (QP3), a charge capacitor C and a discharge NMOS (QN2) wherein a source of the PMOS (QP3) is connected to the power supply input terminal 22 and its drain is connected through the capacitor C to the reference potential input terminal 24, source and drain of the NMOS (QN2) are connected in parallel to both ends of the capacitor C, a gate of the PMOS (QP3) is connected to a gate of the PMOS (QP2) and an output terminal of the error amplifier 201, a gate of the NMOS (QN2) is connected to the clock input terminal 21, and the NMOS (QN2) is periodically turned on by the reference clock CLK that is supplied to its gate to discharge a stored charge of the capacitor C to thereby output a triangular waveform signal W-CLK; and a Schmitt trigger circuit 202 that receives an input of the triangular waveform signal W-CLK (see FIG. 11(b)) obtained at the output terminal of the capacitor C and generates a rectangular waveform signal (i.e., PWM signal, indicated in FIG. 11(c)) with a predetermined threshold value VTH. The PMOS (QP2) and PMOS (QP3) have the same size and the same shape, which are mutually mirror transistors.

With this configuration, in the voltage—current converter circuit, the error amplifier 201 operates in a manner that a voltage drop i·R created by a current i that flows in the reference resistance R becomes equal to the error voltage Vb inputted from the error amplifier 40 to thereby control the current, whereby the current i (=Vb/R) flows through the PMOS (QP2) and the resistance R. As a result, a current corresponding to the error voltage Vb flows through the PMOS (QP2), and the same current also simultaneously flows through the PMOS (QP3). Accordingly, the amount of current that flows through each of the transistors PMOS (QP2) and PMOS (QP3) changes according to the value of the error voltage Vb that is inputted from the error amplifier 40, and as a result, the voltage charged in the capacitor C also changes according to the value of the error voltage Vb. For example, as the error voltage Vb rises, the current value that is charged in the capacitor C linearly increases, and therefore wave height values of the triangular waveform signal that is created by charging and discharging at a constant clock cycle correspond to the increase in the voltage Vb. As a result, the slope of the triangular waveform signal that is generated at both ends of the capacitor C changes as indicated by a waveform in solid line ①, and waveforms in broken lines ② and ③ in FIG. 11(b). By this, the pulse width of the PWM signal that is cut by the threshold value VTH at the Schmitt trigger circuit 202 becomes greater as indicated by a waveform in solid line ①, and waveforms in broken lines ② and ③ in FIG. 11(c). In other words, the slope of the triangular waveform signal changes and the pulse width of the PWM signal is controlled according to the error voltage Vb.

According to the PWM circuit shown in FIG. 10, by the use of a Schmitt trigger circuit having an excellent response, high speed PWM controls that comply with changes in the error output Vb can be realized, and its response can be improved.

SUMMARY

An aspect of the present invention provides power supply circuits having PWM circuits that are capable of PWM control with duties in a range of 0–100%, and that are also capable of high-speed responses. For example, such PWM circuits are capable of creating a PWM signal with a duty in the range of 0–100%; in synchronous rectification type power supply circuits or the like, such that the range of control over output voltages can be broadened. Such PWM circuits generate the PWM signal based on a triangular waveform and error signals obtained by monitoring changes in output voltages.

BRIEF DESCRIPTION OF DRAWINGS

The following discussion may be best understood with reference to the various views of the drawings, described in summary below, which form a part of this disclosure.

DETAILED DESCRIPTION OF THE PREFERRED EMBODIMENTS

Figure 1:
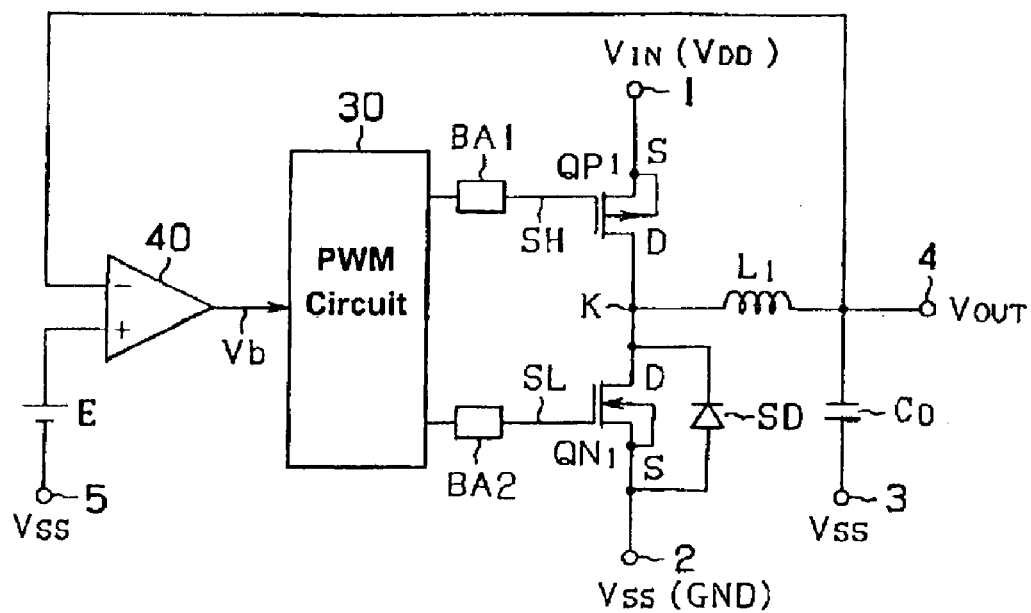
FIG. 1 shows a power supply circuit in accordance with an embodiment of the present invention.

The present invention will now described more fully with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the size of functional units are exaggerated for clarity. Like numbers refer to like elements throughout.

Although embodiments of the present invention are described and illustrated herein as being implemented in a power supply system, the system described is provided as an example and not a limitation. As those skilled in the art will appreciate, other embodiments of the present invention are suitable for application in a variety of different types of electronic systems.

It will be understood that when an element such as a circuit, portion of a circuit, logic unit or line is referred to as being "connected to" or "coupled to" another element, it can be directly connected or coupled to the other element or intervening elements may also be present. In contrast, when an element is referred to as being "directly connected to" or "directly coupled to" another element, there are no intervening elements present. When an element such as a circuit, portion of a circuit, logic unit or line is referred to as being "between" two things, it can be either partly or completely between those two things, but is not necessarily completely and continuously between those two things. The term "adapted to" should be construed to mean "capable of".

As described above, with the PWM circuit shown in FIG. 10, when the error voltage Vb rises, the current value linearly elevates, and the slope of the triangular waveform signal changes such that the pulse width of the PWM signal can be controlled. However, it has been discovered that even though the voltage Vb rises, the value of current that flows has a limit, and thus the slope of the triangular waveform signal may not become 90° or close to 90°.

Figure 10:
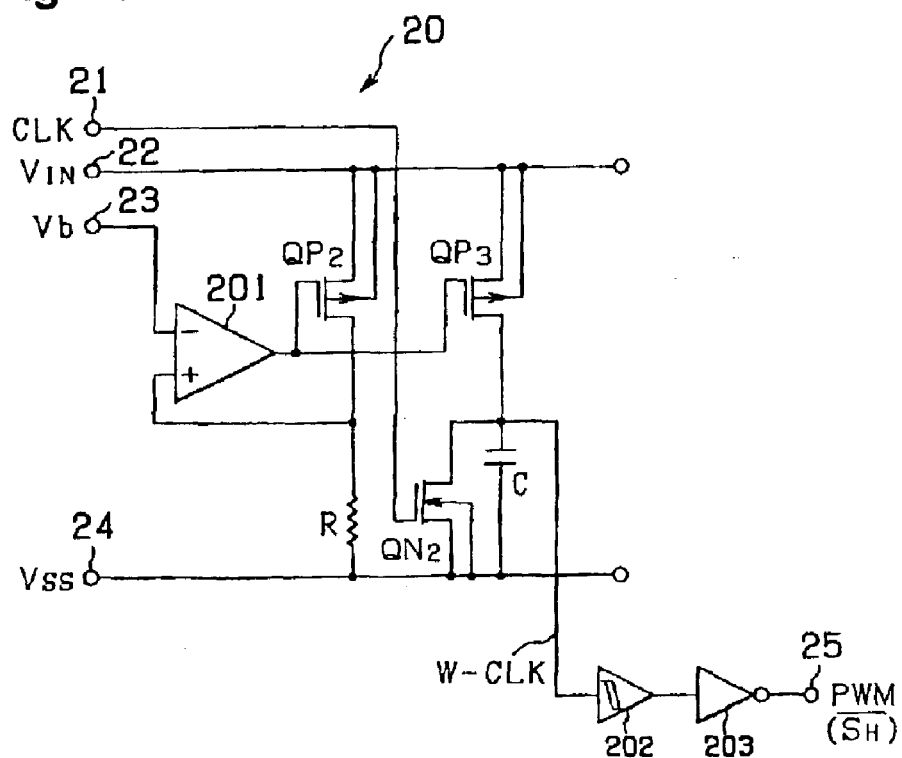
FIG. 10 is a circuit diagram of another example of the PWM circuit in FIG. 7.
Figure 11:
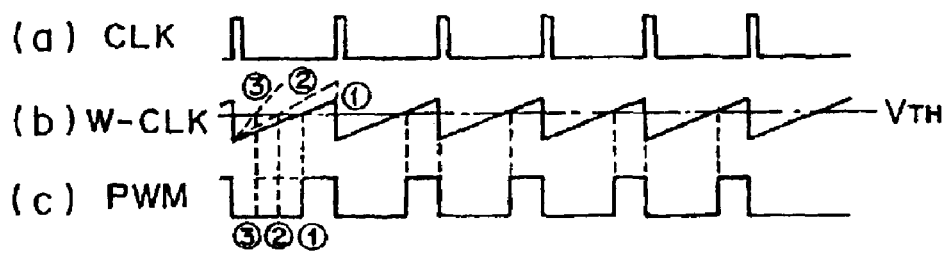
FIG. 11 shows a timing chart for explaining operations in FIG. 10.

If the slope of the triangular waveform signal is 90°, the pulse duty of the PWM signal supplied to the gate of the PMOS (QP1), which contributes to the turn-on time, is 100% (because the PMOS is low-active, and therefore the PMOS is always on when the PWM signal in FIG. 10 is high at all times, and its on-duty is 100%). However, it is difficult to narrow the pulse width (low-active) of the PWM signal to the extent that its duty is close to 100%.

A PWM signal with a narrow pulse width (in other words, with its on-duty being close to 100%) are required to the gate of the PMOS because on certain occasions it may be desirable that the PMOS is turned on at all times by setting the PWM signal at high at all times (e.g., setting the on-duty of the PMOS at 100%)

Figure 12:
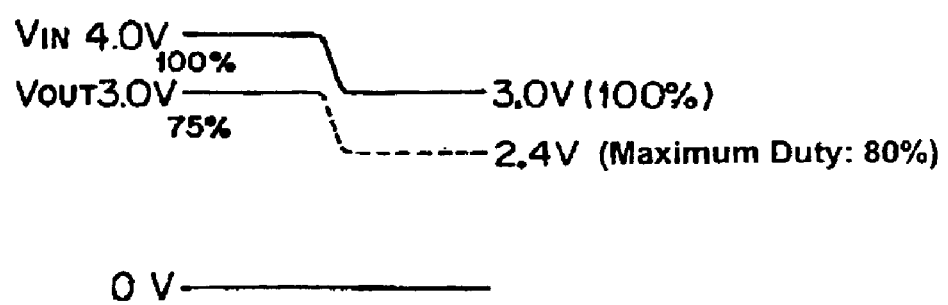
FIG. 12 is a drawing for explaining the necessity of conducting a PWM control with a 100% duty (always in an on-state).

For example, as shown in FIG. 12, when an input voltage VIN (=VDD) is 4.0V, and an output voltage VOUT of 3.0V is being created by using a PWM signal with a 75% duty by the switching regulator circuit, this provides a voltage ratio with a 75% duty width. If the input voltage VIN is maintained at 4V, there would be no problem. However, when the input voltage VIN drops to, for example, 3.0V, the maximum on-duty that can be outputted as the PWM signal may be at most about 80%, and therefore the output voltage VOUT is 80% of the input voltage VIN, which is 2.4V at its maximum. If the PWM signal can maintain its duty in a range between 0% and 100%, a 100% duty for an input voltage VIN of 3.0V. In other words, an output of 3.0V can be maintained, and this can be supplied to the load.

Recently, integrated circuits with lower voltages and lower power consumption have been developed, which has created the necessity to supply voltages lower than 1V as output voltages to be supplied to loads. Accordingly, there are cases where the on-duty of PWM signals need to be set at low values such as for example 5%, 10%, etc.

Embodiments of the present invention have been made in view of the problems described above, and can provide a power supply circuit and a PWM circuit that are capable of PWM control with duties in a range of 0–100%, and that are capable of high-speed responses.

For example, some embodiments provide a power supply circuit that is equipped with: a DC-DC conversion circuit that has an upper transistor and a lower transistor serially connected between a power supply voltage and a reference potential and that controls each of the transistors with a PWM signal, respectively, and gains as an output a PWM-controlled DC output voltage; error detection means that compares the DC output voltage of the DC-DC conversion circuit with a reference voltage and outputs an error amount; and a PWM circuit that generates a PWM signal with a duty in a range between 0% and 100% according to the error output of the error detection means to perform a PWM control for the DC-DC conversion circuit.

As a result, when PWM controls are performed for the DC-DC conversion circuit, a PWM signal with a duty in the rage between 0% and 100% is generated according to an error output of the error detection means to thereby perform PWM controls. When a low output voltage is required, a narrow width PWM signal with a duty close to 0% may be generated to turn on the P-channel transistor for a very short time such that a low voltage can be outputted as an output voltage. When the power supply voltage provided by a battery or the like lowers, a PWM signal with a 100% duty may be generated to turn the P-channel transistor on all times such that the power supply voltage itself can be outputted as an output voltage.

In some embodiments, the PWM circuit may be formed from: first and second PWM circuits that receive an error signal from the error detection means, generate first and second triangular waveform signals, using first and second clocks having a predetermined frequency which are mutually shifted by a half cycle, that have amplitudes according to the error signal and are mutually shifted by a half cycle, and thereafter generate first and second PWM signals, using first and second potential judging circuits, that are mutually shifted by a half cycle; and a mixing circuit that mixes the first and second PWM signals from the first and second PWM circuits and outputs a PWM signal having a frequency that is two times the predetermined frequency.

The first and second triangular waveform signals that are mutually shifted by a half cycle can be generated using first and second clocks that have a frequency equal to half a final operation frequency and are mutually shifted by a half cycle, then first and second PWM signals are generated using the first and second potential judging circuits, each of which may be composed of a Schmitt trigger circuit, and these PWM signals are mixed to create a PWM signal having a final operation frequency. As a result, a PWM signal with a duty ranging between 0% and 100% can be generated according to an error signal, and PWM controls that are difficult to be affected by noises can be performed at high speeds.

In other embodiments, the first PWM circuit may preferably be formed from: a frequency-divided signal input terminal that is supplied with a frequency-divided signal with a 50% duty which is generated based on a main reference clock having a predetermined frequency; a first clock input terminal that is supplied with, among first and second frequency-divided clocks that are generated by dividing the main reference clock into two parts which are mutually shifted by a half cycle, the first frequency-divided clock; a power supply input terminal that is supplied with an input voltage as a power supply voltage; an input terminal that receives an input of an error output from the error detection means; a reference potential input terminal that is given a reference potential; a first voltage-current conversion circuit including a first error amplifier, a first reference resistance and a first current control P-channel transistor, wherein the error output is inputted in a minus (−) terminal of the first error amplifier, a plus (+) terminal of the first error amplifier is connected to a serial connection point between a drain of the first current control P-channel transistor and the first reference resistance, an output terminal of the first error amplifier is connected to a gate of the first current control P-channel transistor, a source of the first current control P-channel transistor is connected to the power supply input terminal, and the first reference resistance is connected to the reference potential input terminal; a first charge-discharge circuit including a first current supply P-channel transistor, a first charge capacitor and a first discharge N-channel transistor, wherein a source of the first current supply P-channel transistor is connected to the power supply input terminal and a drain thereof is connected through the first charge capacitor to the reference potential input terminal, drain and source of the first discharge N-channel transistor are connected in parallel to both ends of the first charge capacitor, a gate of the first current supply P-channel transistor is connected to the gate of the first current control P-channel transistor and the output terminal of the first error amplifier, a gate of the first discharge N-channel transistor is connected to the first clock input terminal, and the first discharge N-channel transistor is periodically turned on by the first frequency-divided clock that is supplied to the gate thereof to discharge a stored charge of the first charge capacitor to output a first triangular waveform signal; a first Schmitt trigger circuit that receives an input of the first triangular waveform signal obtained at an output terminal of the first charge capacitor and generates a rectangular waveform signal with a predetermined threshold value; and a first latch circuit composed of an R-S NOR latch that uses two 2-input NOR elements that receive inputs of the rectangular waveform signal from the first Schmitt trigger circuit and a frequency-divided signal from the frequency-divided signal input terminal, respectively, wherein outputs of the NOR elements are mutually returned to the other and outputted as a first PWM signal, and The second PWM circuit may preferably be formed from: the frequency-divided signal input terminal that is supplied with a frequency-divided signal with a 50% duty which is generated based on a main reference clock having a predetermined frequency; a second clock input terminal that is supplied with, among the first and second frequency-divided clocks that are generated by dividing the main reference clock into two parts which are mutually shifted by a half cycle, the second frequency-divided clock; the power supply input terminal that is supplied with an input voltage as a power supply voltage; the input terminal that receives an input of an error output from the error detection means; the reference potential input terminal that is given the reference potential; a second voltage-current conversion circuit including a second error amplifier, a second reference resistance and a second current control P-channel transistor, wherein the error output is inputted in a minus (−) terminal of the second error amplifier, a plus (+) terminal of the second error amplifier is connected to a serial connection point between a drain of the second current control P-channel transistor and the second reference resistance, an output terminal of the second error amplifier is connected to a gate of the second current control P-channel transistor, a source of the second current control P-channel transistor is connected to the power supply input terminal, and the second reference resistance is connected to the reference potential input terminal; a second charge-discharge circuit including a second current supply P-channel transistor, a second charge capacitor and a second discharge N-channel transistor, wherein a source of the second current supply P-channel transistor is connected to the power supply input terminal and a drain thereof is connected through the second charge capacitor to the reference potential input terminal, drain and source of the second discharge N-channel transistor are connected in parallel to both ends of the second charge capacitor, a gate of the second current supply P-channel transistor is connected to the gate of the second current control P-channel transistor and the output terminal of the second error amplifier, a gate of the second discharge N-channel transistor is connected to the second clock input terminal, and the second discharge N-channel transistor is periodically turned on by the second frequency-divided clock that is supplied to the gate thereof to discharge a stored charge of the second charge capacitor to output a second triangular waveform signal; a second Schmitt trigger circuit that receives an input of the second triangular waveform signal obtained at an output terminal of the second charge capacitor and generates a rectangular waveform signal with a predetermined threshold value; and a second latch circuit composed of an R-S NOR latch that uses two 2-input NOR elements that receive inputs of the rectangular waveform signal from the second Schmitt trigger circuit and a signal that is formed by an inverter through inverting the frequency-divided signal from the frequency-divided signal input terminal, respectively, wherein outputs of the NOR elements are mutually returned to the other and outputted as a second PWM signal.

Furthermore, a PWM circuit in accordance with some embodiments comprises first and second PWM circuits that receive a control signal, generate first and second triangular waveform signals, using first and second clocks having a predetermined frequency which are mutually shifted by a half cycle, that have amplitudes according to the control signal and are mutually shifted by a half cycle, and thereafter generate first and second PWM signals, using first and second potential judging circuits, that are mutually shifted by a half cycle; and a mixing circuit that mixes the first and second PWM signals from the first and second PWM circuits and outputs a PWM signal having a frequency that is two times the predetermined frequency.

The first and second triangular waveform signals that are mutually shifted by a half cycle can be generated using first and second clocks that have a frequency equal to half a final operation frequency and are mutually shifted by a half cycle, then first and second PWM signals are generated using the first and second potential judging circuits, each of which may be composed of a Schmitt trigger circuit, and these PWM signals are mixed to create a PWM signal having a final operation frequency. As a result, a PWM signal with a duty ranging between 0% and 100% can be generated according to an error signal, and PWM controls that are difficult to be affected by noises can be performed at high speeds. Such a PWM circuit can be applied to a variety of electronic circuits that require PWM controls, without being limited to power supply circuits.

Figure 7:
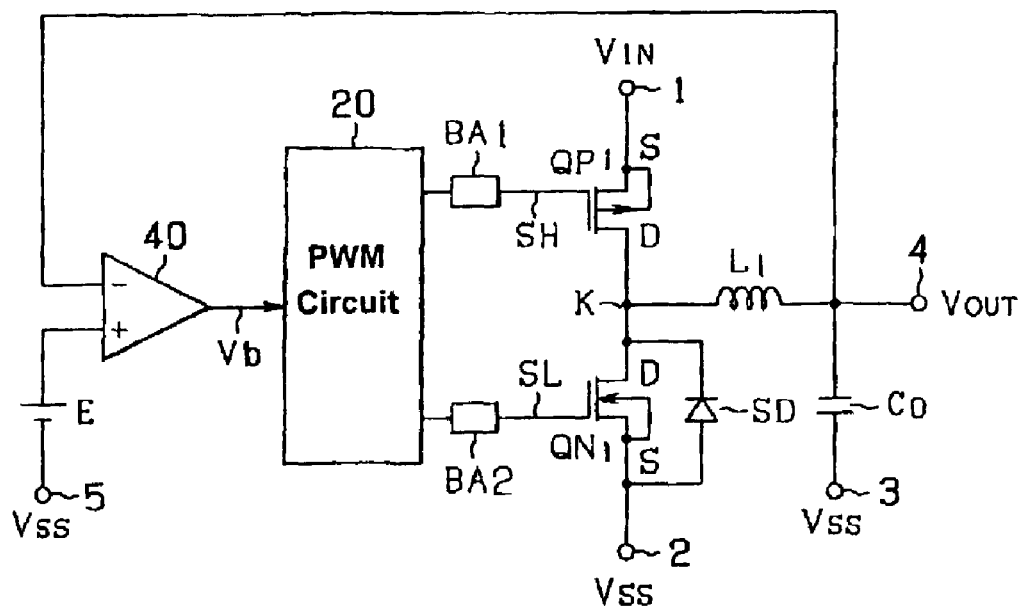
FIG. 7 is a drawing of a composition of a synchronous rectification type switching regulator using a conventional CMOS integrated circuit.
Figure 8:
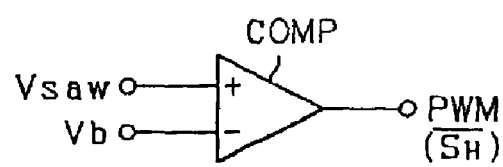
FIG. 8 is a circuit diagram of an example of a PWM circuit in FIG. 7.
Figure 9:
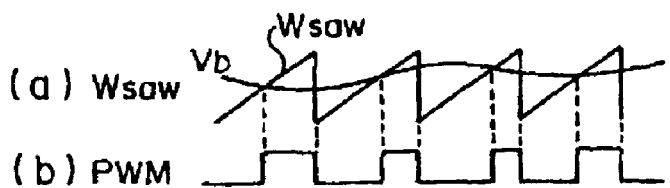
FIG. 9 shows a timing chart for explaining operations in FIG. 8.

FIG. 1 shows a power supply circuit in accordance with an embodiment of the present invention. In the descriptions, elements that are the same as those in the conventional circuit in FIG. 7 are assigned the same reference numerals.

Referring to FIG. 1, the power supply circuit is formed from a DC-DC conversion circuit that comprises a synchronous rectification type switching regulator circuit having an upper transistor (QP1) and a lower transistor (QN1) between a power supply voltage VIN and a reference potential VSS and that outputs a DC voltage VOUT by alternately turning on and off these transistors using PWM signals, an error amplifier 40 that compares an output voltage of the DC-DC conversion circuit with a voltage value of a reference voltage source E to gain an error signal, and a PWM circuit that is capable of controlling the duty of pulse width of the PWM signals in the range of 0–100% based on the error signal to thereby control outputs of the DC-DC conversion circuit at substantially constant value.

The DC-DC conversion circuit has the upper transistor (QP1) and the lower transistor (QN1) serially connected to each other with their drains D being shared between a terminal 1 that is supplied with a DC voltage VIN (=a power supply voltage VDD, which is, for example, 4V) as an input voltage and a terminal 2 that is given a reference potential VSS (=a ground potential GND, which is, for example, 0V). A source S of the upper transistor (QP1) connects to the terminal 1, and a source of the lower transistor (QN1) connects to the terminal 2.

High frequency pulses SH and SL are supplied from the PWM circuit 30 as PWM signals to gates of the upper transistor (QP1) and the lower transistor (QN1), respectively. The transistors are alternately turned on and off by the high frequency pulses SH and SL to thereby generate an AC voltage VMA at an intermediate node K that is a connection point of the two transistors.

Figure 2:
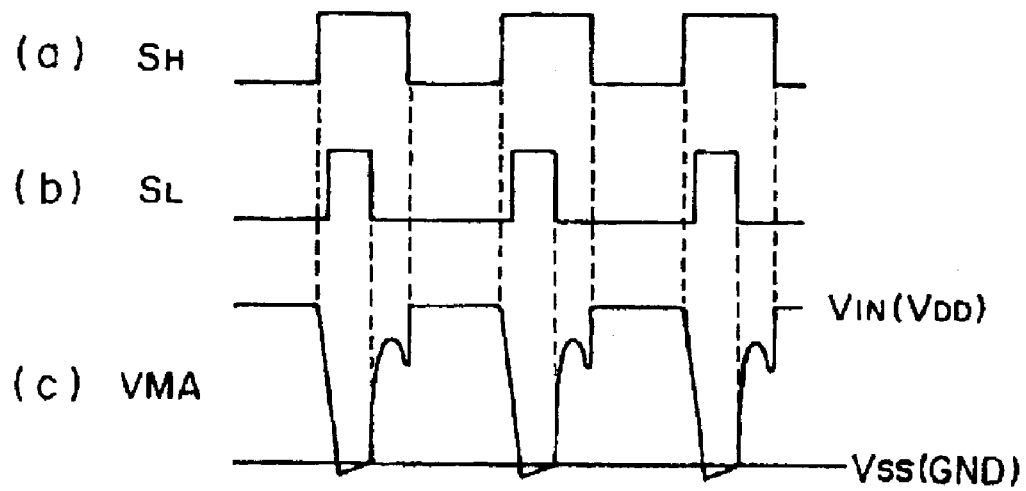
FIG. 2 shows a timing chart indicating relations between PWM signals SH and SL, and an intermediate node potential VMA in a DC-DC conversion circuit of the power supply circuit of FIG. 1.

As shown in FIGS. 2(a) and 2(b), the gate pulse SL applied to the lower transistor (QN1) and the gate pulse SH applied to the upper transistor (QP1) are generally synchronized, but their pulse widths are different due to their load conditions. The period in which the gate pulse SL becomes to be high level is formed narrower than the period in which the gate pulse SH becomes to be high level, such that the PMOS and the NMOS do not simultaneously turn on, which prevent a through current from flowing from the power supply VIN side to the reference potential VSS side. Also, a Schottky diode SD is connected between the source and drain of the lower transistor (QN1) to prevent an excessive voltage to the low side transistor and backup power supply.

A rectification coil L1 and a stabilizing capacitor C0 are serially connected between the intermediate node K at which the current voltage VMA is given and the terminal 2 at which the reference potential VSS is given. A DC voltage VOUT (for example, 1.5V) that has been smoothed out by the stabilizing capacitor C0 is outputted to an output terminal 4 that is connected to the connection point, and is supplied to a load not shown.

The outputted DC voltage VOUT is returned through a feedback line to the minus (−) terminal of the error amplifier 40, and is compared with a voltage value of the reference voltage source E that is connected to a terminal 5 that is provided with the reference potential VSS.

An error voltage, which is a result of the comparison by the error amplifier 40, is supplied to the PWM circuit 30, and the pulse width of the PWM signal that is generated by the PWM circuit 30 is controlled by the error voltage. This feedback control can provide an output voltage VOUT (for example, 1.5V) that is to be supplied to the load (not shown) that is controlled to always be substantially constant.

In the structure described above, PWM signals from the PWM circuit 30 are inverted by output buffers BA1 and BA2, respectively, to become high frequency (for example, 1 MHz) pulses SH and SL having appropriate pulse widths that are generally mutually synchronized, and which are applied to the gates of the upper transistor (QP1) and the lower transistor (QN1), respectively. The high frequency pulses SH and SL are pulses similar to those shown in FIGS. 2(a) and 2(b). Because the upper transistor (QP1) and the lower transistor (QN1) are mutually, alternately turned on and off by the generally synchronized high frequency pulses SH and SL, an AC voltage VMA, which is similar to the one shown in FIG. 2(c), is generated at the intermediate node K. A current flows through the coil L1 and is charged in the stabilizing capacitor C0 based on the AC voltage VMA, and as a result, the output voltage VOUT that is a DC voltage is provided at the output terminal 4.

Figure 3:
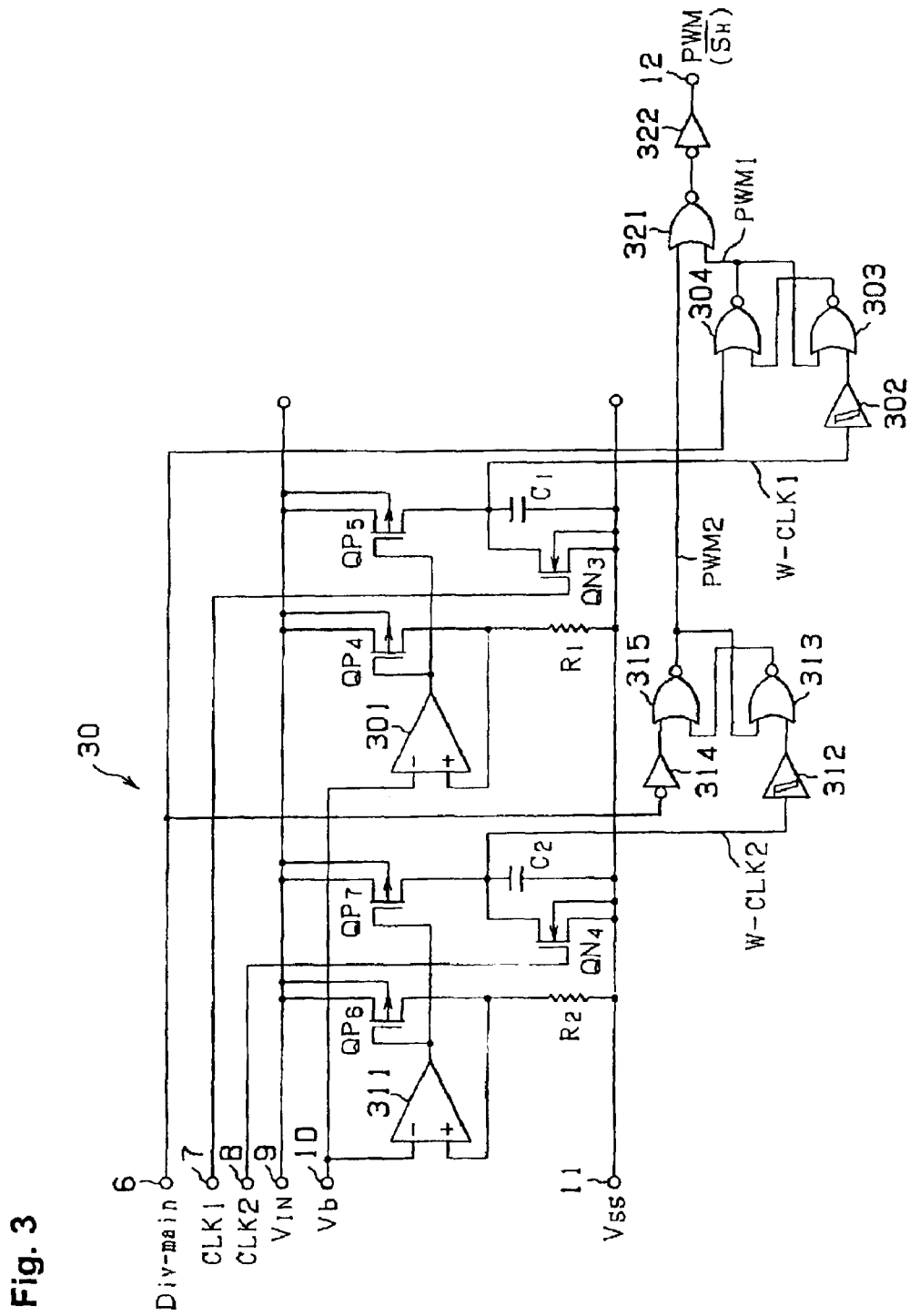
FIG. 3 is a circuit diagram of an example of a PWM circuit in the power supply circuit in FIG. 1.

FIG. 3 is a circuit diagram of an example of the PWM circuit 30. The PWM circuit 30 includes first and second PWM circuits connected in parallel with each other, each having substantially the same structure as that of the PWM circuit 20 shown in FIG. 10, which frequency-divides the reference clock (for example, 1 MHz) into two parts and shifts them from each other by a half cycle to create two kinds of frequency-divided clocks (each having 500 kHz). The PWM circuit 30 also creates triangular waveform signals that are mutually shifted by a half cycle by respective charge/discharge circuits of the first and second PWM circuits. The PWM circuit 30 also converts the triangular waveform signals into first and second PWM signals by Schmitt trigger circuits, respectively, and mixes them to create a PWM signal to be outputted to the CMOS inverter circuit.

Accordingly, the PWM circuit 30 includes first and second PWM circuits that receive an input of error signal Vb from the error amplifier, and creates first and second triangular waveform signals that are mutually shifted by a half cycle and have amplitudes according to the error signal Vb, and creates first and second PWM signals, and a mixing circuit that mixes the first and second PWM signals from the first and second PWM circuits into a PWM signal to be outputted.

In an embodiment, the first PWM circuit includes a frequency-divided signal input terminal 6 that is supplied with a frequency-divided signal which is generated based on a main reference clock of, for example, 1 MHz (see FIG. 4(a)); a first clock input terminal 7 that is supplied with, among first and second frequency-divided clocks CLK1 and CLK2 (500 kHz each) that are generated by dividing the main reference clock (of 1 MHz, for example) into two parts which are mutually shifted by a half cycle from the first frequency-divided clock CLK1. The first PWM circuit also includes a power supply input terminal 9 that is supplied with an input voltage VIN as a power supply voltage; an input terminal 10 that receives an input of an error output Vb from the error amplifier 40; and a reference potential input terminal 11 that is given a reference potential VSS;

The first PWM circuit also includes a first voltage-current conversion circuit that generates a current according to the error voltage Vb; a first charge-discharge circuit that charges a capacitor C1 via the current generated by the first voltage-current conversion circuit at a constant clock cycle and thereafter discharges the same to create a triangular waveform signal W-CLK1 having an amplitude (rising slope) according to the error voltage Vb. In addition, a first Schmitt trigger circuit 302 that is inputted with the triangular waveform signal W-CLK1 and generates a rectangular waveform; and a first latch circuit that latches the rectangular waveform for a specified period of time.

The first voltage-current conversion circuit includes an error amplifier 301, a reference resistance R1 and a current control PMOS (QP4), wherein the error output Vb is inputted in a minus (−) terminal of the error amplifier 301, a plus (+) terminal of the error amplifier 301 is connected to a serial connection point between a drain of the PMOS (QP4) and the reference resistance R1, an output terminal of the error amplifier 301 is connected to a gate of the PMOS (QP4), a source of the PMOS (QP4) is connected to the power supply input terminal 9, and the reference resistance R1 is connected to the reference potential input terminal 11.

Figure 4:
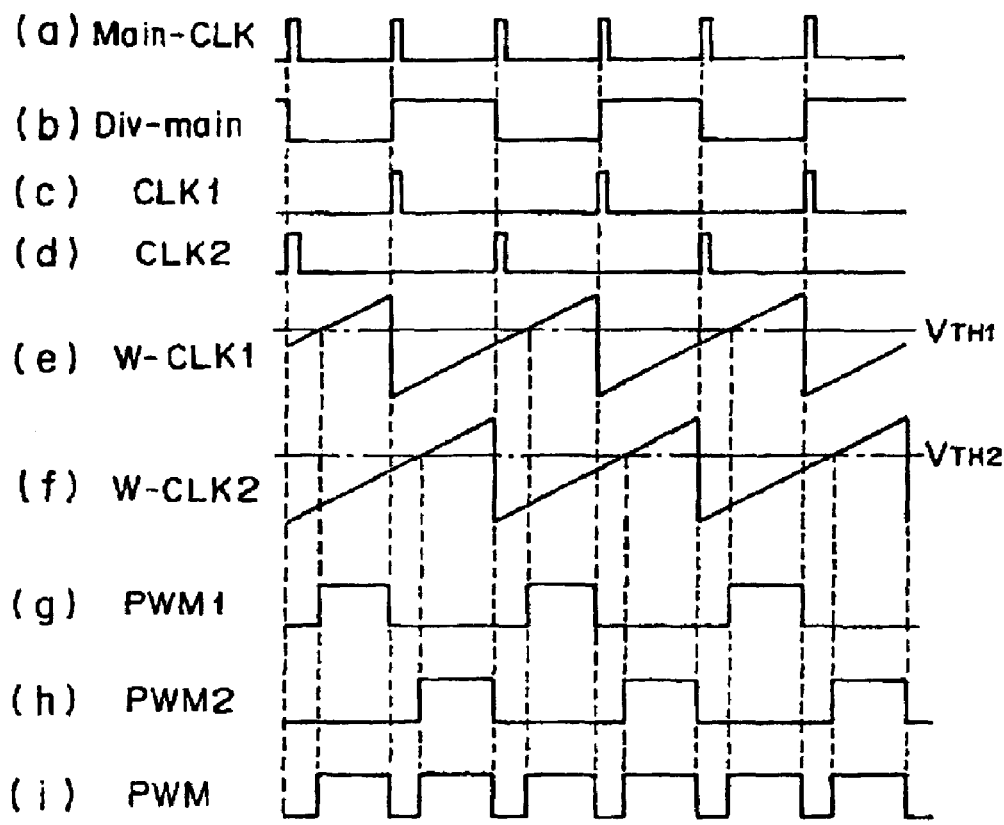
FIG. 4 shows a timing chart indicating signal waveforms at various sections of the PWM circuit shown in FIG. 3.

The first charge-discharge circuit includes a current supply PMOS (QP5), a charge capacitor C1 and a discharge NMOS (QN3), wherein a source of the PMOS (QP5) is connected to the power supply input terminal 9 and a drain thereof is connected through the charge capacitor C1 to the reference potential input terminal 11, drain and source of the NMOS (QN3) are connected in parallel to both ends of the charge capacitor C1, a gate of the PMOS (QP5) is connected to the gate of the PMOS (QP4) and the output terminal of the error amplifier 301, and a gate of the NMOS (QN3) is connected to the clock input terminal 7. As shown in FIG. 4(*e*), the NMOS (QN3) is periodically turned on by the clock CLK1 that is supplied to the gate thereof to discharge a stored charge of the charge capacitor C1 to output a triangular waveform signal W-CLK1.

The first Schmitt trigger circuit 302 receives an input of the triangular waveform signal W-CLK1 obtained at an output terminal of the charge capacitor C1 and creates a rectangular waveform signal (which is the first PWM signal, shown in FIG. 4(*g*)) with a predetermined threshold value VTH1.

The first latch circuit is composed of an R–S NOR latch that uses two 2-input NOR elements 303 and 304 that receive inputs of the PWM signal from the first Schmitt trigger circuit 302 and a frequency-divided signal from the frequency-divided signal input terminal 6, respectively. Outputs of the NOR elements are mutually returned as inputs to the other and outputted as a first PWM signal (PWM1).

The second PWM circuit has a similar structure as that of the first PWM circuit. The second PWM circuit includes the frequency-divided signal input terminal 6 that is supplied with a frequency-divided signal which is generated based on a main reference clock of, for example, 1 MHz (see FIG. 4(*a*)); a second clock input terminal 8 that is supplied with, among the first and second frequency-divided clocks CLK1 and CLK2 (each having 500 kHz) that are generated by dividing the main reference clock (of 1 MHz, for example) into two parts which are mutually shifted by a half cycle, the second frequency-divided clock CLK2; the power supply input terminal 9 that is supplied with the input voltage VIN as a power supply voltage; the input terminal 10 that receives an input of the error output Vb from the error amplifier 40; and the reference potential input terminal 11 that is given the reference potential VSS. The second PWM circuit also includes a second voltage-current conversion circuit that generates a current according to the error voltage Vb; a second charge-discharge circuit that charges in a capacitor C2 the current generated by the second voltage-current conversion circuit at a constant clock cycle and thereafter discharges the same to create a triangular waveform signal W-CLK2 having an amplitude (rising slope) according to the error voltage Vb; a second Schmitt trigger circuit 312 that is inputted with the triangular waveform signal W-CLK2 and generates a rectangular waveform; and a second latch circuit that latches the rectangular waveform for a specified period of time.

The second voltage-current conversion circuit includes an error amplifier 311, a reference resistance R2 and a current control PMOS (QP6). The error output Vb is inputted in a minus (−) terminal of the error amplifier 311. A plus (+) terminal of the error amplifier 311 is connected to a serial connection point between a drain of the PMOS (QP6) and the reference resistance R2. An output terminal of the error amplifier 311 is connected to a gate of the PMOS (QP6), a source of the PMOS (QP6) is connected to the power supply input terminal 9, and the reference resistance R2 is connected to the reference potential input terminal 11.

The second charge-discharge circuit includes a current supply PMOS (QP7), a charge capacitor C2 and a discharge NMOS (QN4). A source of the PMOS (QP7) is connected to the power supply input terminal 9 and a drain thereof is connected through the charge capacitor C2 to the reference potential input terminal 11. Drain and source of the NMOS (QN4) are connected in parallel to both ends of the charge capacitor C2, a gate of the PMOS (QP7) is connected to the gate of the PMOS (QP6) and the output terminal of the error amplifier 311. A gate of the NMOS (QN4) is connected to the clock input terminal 7, and the NMOS (QN4) is periodically turned on by the clock CLK2 that is supplied to the gate thereof to discharge a stored charge of the charge capacitor C2 to output a triangular waveform signal W-CLK2 as shown in FIG. 4(*f*).

The second Schmitt trigger circuit 312 receives an input of the triangular waveform signal W-CLK2 obtained at an output terminal of the charge capacitor C2 and creates a rectangular waveform signal, which is the second PWM signal, as shown in FIG. 4(*g*) with a predetermined threshold value VTH2.

The second latch circuit is composed of an R-S NOR latch that uses two 2-input NOR elements 313 and 315 that receive inputs of the PWM signal from the second Schmitt trigger circuit 312 and a signal obtained by inverting, via an inverter 314, the frequency-divided signal from the frequency-divided signal input terminal 6, respectively. Outputs of the NOR elements are mutually returned as inputs to the other and outputted as a second PWM signal (PWM2).

The mixing circuit is composed of, for example, an OR circuit that provides a logical sum of the first and second PWM signals (PWM1) and (PWM2) or a combined circuit of a NOR circuit 321 and a NOT circuit 322.

Next, actions and effects of the circuit shown in FIG. 3 are described with reference to FIGS. 4–6. Operations of each of the first and second PWM circuits are similar to the operations of the PWM circuit shown in FIG. 10, and therefore their description to the extent it is similar is omitted.

FIG. 4(*a*) is a main reference clock Main-CLK of, for example, 1 MHz. FIG. 4(*b*) indicates a frequency-divided signal Div-main with a 50% duty that is created based on the main reference clock Main-CLK. FIG. 4(*c*) indicates a frequency-divided clock CLK1 of, for example, 500 KHz that is obtained by dividing the main reference clock Main-CLK of FIG. 4(*a*) into two portions. FIG. 4(*d*) indicates a frequency-divided clock CLK2 of, for example, 500 KHz that is obtained by dividing the main reference clock Main-CLK of FIG. 4(*a*) into two portions and that is shifted by a half cycle with respect to the frequency-divided clock of FIG. 4(*c*). FIG. 4(*e*) indicates a triangular waveform signal W-CLK1 that is created in the first PWM circuit using the frequency-divided clock CLK1 of FIG. 4(*c*). FIG. 4(*f*) indicates a triangular waveform signal W-CLK2 that is created in the second PWM circuit using the frequency-divided clock CLK2 of FIG. 4(*d*). FIG. 4(*g*) indicates a PWM signal (PWM1) that is created based on the triangular waveform signal W-CLK1 of FIG. 4(*e*). FIG. 4(*h*) indicates a PWM signal (PWM2) that is created based on the triangular waveform signal W-CLK2 of FIG. 4(*f*); and FIG. 4(*i*) indicates a PWM signal that is obtained by mixing the first and second PWM signals (PWM1) and (PWM2), which is supplied as the gate pulse SH to the gate of the upper transistor (QP1) in FIG. 1. It is noted that the gate pulse SL to be supplied to the gate of the lower transistor (QN1) in FIG. 1 is created by a pulse having a high level period that is inside and is slightly narrower than the high level period of the gate pulse SH.

The PWM circuit 30 shown in FIG. 3 includes the first and second PWM circuits connected in parallel with each other, each having substantially the same structure as that of the PWM circuit 20 shown in FIG. 10, which frequency-divides the main reference clock (for example, 1 MHz) into two parts and shifts them from each other by a half cycle to create two kinds of frequency-divided clocks (each having 500 kHz). The PWM circuit 30 also creates triangular waveform signals that are mutually shifted by a half cycle by the respective charge/discharge circuits of the first and second PWM circuits, creates first and second PWM signals by inputting the triangular waveform signals into the first and second Schmitt trigger circuits, respectively, and mixes them to create the PWM signal as indicated in FIG. 4(i) to be outputted. As a result, a PWM signal whose level status can be from all high to all low can be generated.

By the PWM circuit 20 shown in FIG. 10, which attempts to create a PWM waveform with a single phase oscillation (only by W-CLK1), it is difficult to create a PWM pulse (i.e., a low active pulse) having a narrow PWM pulse width which is close to a 0% duty (always off-state) or a PWM pulse having a wide pulse width which is close to a 100% duty (always on-state), whose high level portion has a narrow width because it is low active. However, by creating two oscillation signals that are mutually shifted by a half cycle (creating two phases) in accordance with embodiments of the present invention shown in FIG. 3, the PWM control can be conducted with a PWM signal with a duty ranging from 0% to 100%.

Figure 5:
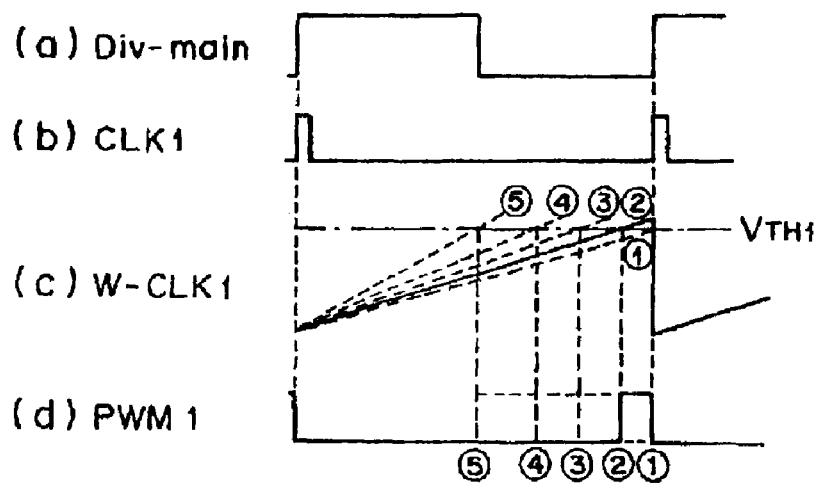
FIG. 5 is a drawing to explain generation of triangular waveform and PWM signal by a first PWM circuit that composes the PWM circuit shown in FIG. 3.

FIG. 5 shows main waveforms in the first PWM circuit which correspond to the waveforms in FIG. 4. In particular, FIG. 5 shows an enlarged view of the triangular waveform. FIG. 5(a) indicates a frequency-divided signal Div-main with a 50% duty that is created based on the main reference clock Main-CLK of, for example, 1 MHz. FIG. 5(b) is a frequency-divided clock CLK1 of, for example, 500 KHz that is obtained by dividing the main reference clock Main-CLK into two portions. FIG. 5(c) indicates a triangular waveform signal W-CLK1 that is created in the first PWM circuit using the frequency-divided clock CLK1 of FIG. 5(b). FIG. 5(d) indicates a first PWM signal (PWM1) that is created based on the triangular waveform signal W-CLK1 of FIG. 5(c).

The rising slope of the waveform of the triangular waveform signal W-CLK1 changes according to changes in the amplitude of the error signal Vb provided from the error amplifier 40 as is described above. As a result, the width of the PWM signal (PWM1) that is created by the Schmitt trigger circuit 302 changes. In other words, as indicated in FIG. 5(c), the greater the voltage of the error signal Vb, the greater the slope of the triangular waveform becomes as indicated at ②, ③, ④ and ⑤, and the rising section of the pulse width of the first PWM signal (PWM1) shifts accordingly to the left side as indicated at ②, ③, ④ and ⑤. In other words, the duty of the low active pulse changes from 100% to 50%. The same applies to changes in the slope of the triangular waveform signal W-CLK2 that is shifted by a half cycle and the pulse width of the second PWM signal (PWM2).

Figure 6:
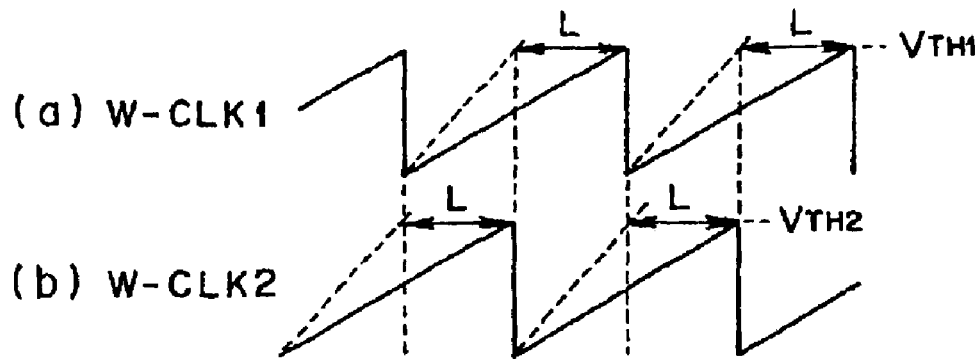
FIG. 6 is a drawing to explain ranges of slopes of triangular waveforms that can be realized in first and second PWM circuits that compose the PWM circuit shown in FIG. 3 and their effects.

FIG. 6 indicates ranges of slopes of the triangular waveform signals W-CLK1 and W-CLK2 (maximum variable ranges of the triangular waveforms required by the present embodiment). Slopes of both the triangular waveforms W-CLK1 and W-CLK2 may be changed only in a range indicated by arrows labeled L. It is appreciated from the generation timings and slope ranges of the triangular waveforms W-CLK1 and W-CLK2 indicated in FIG. 1 that, when both of the triangular waveforms W-CLK1 and W-CLK2 have waveforms indicated by solid lines, a PWM control in all low (always in an off state) is possible, and when both of the triangular waveforms W-CLK1 and W-CLK2 have waveforms indicated by broken lines, a PWM control in all high (always in an on state) is possible.

In accordance with the present embodiment described above, when creating a PWM waveform according to an error voltage, a single high frequency reference clock is frequency-divided to form two reference clocks that are shifted from each other by a half cycle in two phases, such that PWM signals with duties ranging from 0% to 100% can be created, and therefore the PWM control with a wider control range can be conducted. Also Schmitt trigger circuits can be used such that high-speed PWM control that is relatively immune from noises can be realized. Therefore, PWM circuits with greater responses can be realized. Such PWM circuits can be implemented, for example, in power supply circuits.

Thus, power supply circuits having PWM circuits are provided that are capable of PWM control with duties in a range of 0–100%, and that are capable of high-speed responses. Such circuits can be equipped with a DC-DC conversion circuit that has a PMOS (QP1) and a NMOS (QN1) serially connected between a power supply input terminal 1 and a reference potential input terminal 2 in which they are alternately turned on with PWM signals, respectively, to obtain as an output a PWM-controlled DC output voltage. An error amplifier 40 compares the DC output voltage with a reference voltage and outputs an error amount. A PWM circuit 30 performs a PWM control with a duty in a range of 0–100% according to the error output of the error amplifier 40. The PWM circuit 30 creates triangular waveform signals that are mutually shifted by a half cycle with charge/discharge circuits for generating triangular waveforms using first and second frequency-divided clocks that are mutually shifted by a half cycle (each having 500 kHz), converts the triangular waveform signals with first and second Schmitt trigger circuits to first and second PWM signals, and mixes them to generate a PWM signal. The DC-DC conversion circuit that has a PMOS (QP1) and a NMOS (QN1) serially connected between a power supply input terminal 1 and a reference potential input terminal 2 in which they are alternately turned on with PWM signals, respectively, to obtain as an output a PWM-controlled DC output voltage. The error amplifier 40 compares the DC output voltage with a reference voltage and outputs an error amount.

The PWM circuit 30 performs a PWM control with a duty in a range of 0–100% according to the error output of the error amplifier 40. The PWM circuit 30 creates triangular waveform signals that are mutually shifted by a half cycle with charge/discharge circuits for generating triangular waveforms using first and second frequency-divided clocks that are mutually shifted by a half cycle (each having 500 kHz), converts the triangular waveform signals with first and second Schmitt trigger circuits to first and second PWM signals, and mixes them to generate a PWM signal.

While aspects of the present invention have been described in terms of certain preferred embodiments, those of ordinary skill in the will appreciate that certain variations, extensions and modifications may be made without varying from the basic teachings of the present invention. As such, the present invention is not to be limited to the specific preferred embodiments described herein. Rather, the scope of some embodiments of the present invention is to be determined from the claims, which follow.

What is claimed is:

1. A power supply circuit, comprising:
   a DC-DC conversion circuit that controls an upper transistor and a lower transistor with a plurality of PWM signals, respectively, and generates a PWM-controlled DC output voltage,
   wherein the upper transistor and the lower transistor are serially connected between a power supply voltage and a reference potential;
   an error detection unit that compares the PWM-controlled DC output voltage with a reference voltage and outputs an error amount; and
   a plurality of PWM circuits that generate the plurality of PWM signals that provide PWM control for the DC-DC conversion circuit,
   wherein the PWM circuits receive an error signal from the error detection unit and generate the PWM signals using potential judging circuits that are mutually shifted by a half cycle, and
   wherein the PWM signals have a duty in a range of 0–100% according to the error output of the error detection unit.

2. A power supply circuit according to claim 1, wherein the plurality of PWM circuits, comprise:
   first and second PWM circuits that receive the error signal from the error detection unit, generate first and second triangular waveform signals, using first and second clocks having a predetermined frequency which are mutually shifted by a half cycle, that have amplitudes according to the error signal and are mutually shifted by a half cycle, and thereafter generate first and second PWM signals, using first and second potential judging circuits, that are mutually shifted by a half cycle; and
   a mixing circuit that mixes the first and second PWM signals from the first and second PWM circuits and outputs a PWM signal having a frequency that is two times the predetermined frequency.

3. A power supply circuit according to claim 2, wherein he first PWM circuit, comprises:
   a frequency-divided signal input terminal that is supplied with a frequency-divided signal with a 50% duty which is generated based on a main reference clock having a predetermined frequency;
   a first clock input terminal that is supplied with, among first and second frequency-divided clocks that are generated by dividing the main reference clock into two parts which are mutually shifted by a half cycle, the first frequency-divided clock;
   a power supply input terminal that is supplied with an input voltage as a power supply voltage;
   an input terminal that receives an input of an error output from the error detection unit;
   a reference potential input terminal that is given a reference potential;
   a first voltage-current conversion circuit including a first error amplifier, a first reference resistance and a first current control P-channel transistor, wherein the error output is inputted in a minus (−) terminal of the first error amplifier, a plus (+) terminal of the first error amplifier is connected to a serial connection point between a drain of the first current control P-channel transistor and the first reference resistance, an output terminal of the first error amplifier is connected to a gate of the first current control P-channel transistor, a source of the first current control P-channel transistor is connected to the power supply input terminal, and the first reference resistance is connected to the reference potential input terminal;
   a first charge-discharge circuit including a first current supply P-channel transistor, a first charge capacitor and a first discharge N-channel transistor, wherein a source of the first current supply P-channel transistor is connected to the power supply input terminal and a drain thereof is connected through the first charge capacitor to the reference potential input terminal, drain and source of the first discharge N-channel transistor are connected in parallel to both ends of the first charge capacitor, a gate of the first current supply P-channel transistor is connected to the gate of the first current control P-channel transistor and the output terminal of the first error amplifier, a gate of the first discharge N-channel transistor is connected to the first clock input terminal, and the first discharge N-channel transistor is periodically turned on by the first frequency-divided clock that is supplied to the gate thereof to discharge a stored charge of the first charge capacitor to output a first triangular waveform signal;
   a first Schmitt trigger circuit that receives an input of the first triangular waveform signal obtained at an output terminal of the first charge capacitor and generates a rectangular waveform signal with a predetermined threshold value; and
   a first latch circuit composed of an R-S NOR latch that uses two 2-input NOR elements that receive inputs of the rectangular waveform signal from the first Schmitt trigger circuit and a frequency-divided signal from the frequency-divided signal input terminal, respectively, wherein outputs of the NOR elements are mutually returned to the other and outputted as a first PWM signal.

4. A power supply circuit according to claim 3, wherein the second PWM circuit, comprises:
   the frequency-divided signal input terminal that is supplied with a frequency-divided signal with a 50% duty which is generated based on a main reference clock having a predetermined frequency;
   a second clock input terminal that is supplied with, among the first and second frequency-divided clocks that are generated by dividing the main reference clock into two parts which are mutually shifted by a half cycle, the second frequency-divided clock;
   the power supply input terminal that is supplied with an input voltage as a power supply voltage;
   the input terminal that receives an input of an error output from the error detection unit;
   the reference potential input terminal that is given the reference potential;
   a second voltage-current conversion circuit including a second error amplifier, a second reference resistance and a second current control P-channel transistor, wherein the error output is inputted in a minus (−) terminal of the second error amplifier, a plus (+) terminal of the second error amplifier is connected to a serial connection point between a drain of the second current control P-channel transistor and the second reference resistance, an output terminal of the second error amplifier is connected to a gate of the second current control P-channel transistor, a source of the second current control P-channel transistor is connected to the power supply input terminal, and the second reference resistance is connected to the reference potential input terminal;

a second charge-discharge circuit including a second current supply P-channel transistor, a second charge capacitor and a second discharge N-channel transistor, wherein a source of the second current supply P-channel transistor is connected to the power supply input terminal and a drain thereof is connected through the second charge capacitor to the reference potential input terminal, drain and source of the second discharge N-channel transistor are connected in parallel to both ends of the second charge capacitor, a gate of the second current supply P-channel transistor is connected to the gate of the second current control P-channel transistor and the output terminal of the second error amplifier, a gate of the second discharge N-channel transistor is connected to the second clock input terminal, and the second discharge N-channel transistor is periodically turned on by the second frequency-divided clock that is supplied to the gate thereof to discharge a stored charge of the second charge capacitor to output a second triangular waveform signal;

a second Schmitt trigger circuit that receives an input of the second triangular waveform signal obtained at an output terminal of the second charge capacitor and generates a rectangular waveform signal with a predetermined threshold value; and a second latch circuit composed of an R-S NOR latch that uses two 2-input NOR elements that receive inputs of the rectangular waveform signal from the second Schmitt trigger circuit and a signal that is formed by an inverter through inverting the frequency-divided signal from the frequency-divided signal input terminal, respectively, wherein outputs of the NOR elements are mutually returned to the other and outputted as a second PWM signal.

5. A PWM circuit, comprising:

first and second PWM circuits that receive a control signal, generate first and second triangular waveform signals, using first and second clocks having a predetermined frequency which are mutually shifted by a half cycle, that have amplitudes according to the control signal and are mutually shifted by a half cycle, and thereafter generate first and second PWM signals, using first and second potential judging circuits, that are mutually shifted by a half cycle; and a mixing circuit that mixes the first and second PWM signals from the first and second PWM circuits and outputs a PWM signal having a frequency that is two times the predetermined frequency.

6. A power supply circuit according to claim 5, wherein the first PWM circuit, comprises:

a frequency-divided signal input terminal that is supplied with a frequency-divided signal with a 50% duty which is generated based on a main reference clock having a predetermined frequency;

a first clock input terminal that is supplied with, among first and second frequency-divided clocks that are generated by dividing the main reference clock into two parts which are mutually shifted by a half cycle, the first frequency-divided clock;

a power supply input terminal that is supplied with an input voltage as a power supply voltage;

an input terminal that receives an input of an error output from the error detection unit;

a reference potential input terminal that is given a reference potential;

a first voltage-current conversion circuit including a first error amplifier, a first reference resistance and a first current control P-channel transistor, wherein the error output is inputted in a minus (−) terminal of the first error amplifier, a plus (+) terminal of the first error amplifier is connected to a serial connection point between a drain of the first current control P-channel transistor and the first reference resistance, an output terminal of the first error amplifier is connected to a gate of the first current control P-channel transistor, a source of the first current control P-channel transistor is connected to the power supply input terminal, and the first reference resistance is connected to the reference potential input terminal;

a first charge-discharge circuit including a first current supply P-channel transistor, a first charge capacitor and a first discharge N-channel transistor, wherein a source of the first current supply P-channel transistor is connected to the power supply input terminal and a drain thereof is connected through the first charge capacitor to the reference potential input terminal, drain and source of the first discharge N-channel transistor are connected in parallel to both ends of the first charge capacitor, a gate of the first current supply P-channel transistor is connected to the gate of the first current control P-channel transistor and the output terminal of the first error amplifier, a gate of the first discharge N-channel transistor is connected to the first clock input terminal, and the first discharge N-channel transistor is periodically turned on by the first frequency-divided clock that is supplied to the gate thereof to discharge a stored charge of the first charge capacitor to output a first triangular waveform signal;

a first Schmitt trigger circuit that receives an input of the first triangular waveform signal obtained at an output terminal of the first charge capacitor and generates a rectangular waveform signal with a predetermined threshold value; and a first latch circuit composed of an R-S NOR latch that uses two 2-input NOR elements that receive inputs of the rectangular waveform signal from the first Schmitt trigger circuit and a frequency-divided signal from the frequency-divided signal input terminal, respectively, wherein outputs of the NOR elements are mutually returned to the other and outputted as a first PWM signal.

7. A power supply circuit according to claim 6, wherein the second PWM circuit, comprises:

the frequency-divided signal input terminal that is supplied with a frequency-divided signal with a 50% duty which is generated based on a main reference clock having a predetermined frequency;

a second clock input terminal that is supplied with, among the first and second frequency-divided clocks that are generated by dividing the main reference clock into two parts which are mutually shifted by a half cycle, the second frequency-divided clock;

the power supply input terminal that is supplied with an input voltage as a power supply voltage;

the input terminal that receives an input of an error output from the error detection unit;

the reference potential input terminal that is given the reference potential;

a second voltage-current conversion circuit including a second error amplifier, a second reference resistance and a second current control P-channel transistor, wherein the error output is inputted in a minus (−) terminal of the second error amplifier, a plus (+)

terminal of the second error amplifier is connected to a serial connection point between a drain of the second current control P-channel transistor and the second reference resistance, an output terminal of the second error amplifier is connected to a gate of the second current control P-channel transistor, a source of the second current control P-channel transistor is connected to the power supply input terminal, and the second reference resistance is connected to the reference potential input terminal;

a second charge-discharge circuit including a second current supply P-channel transistor, a second charge capacitor and a second discharge N-channel transistor, wherein a source of the second current supply P-channel transistor is connected to the power supply input terminal and a drain thereof is connected through the second charge capacitor to the reference potential input terminal, drain and source of the second discharge N-channel transistor are connected in parallel to both ends of the second charge capacitor, a gate of the second current supply P-channel transistor is connected to the gate of the second current control P-channel transistor and the output terminal of the second error amplifier, a gate of the second discharge N-channel transistor is connected to the second clock input terminal, and the second discharge N-channel transistor is periodically turned on by the second frequency-divided clock that is supplied to the gate thereof to discharge a stored charge of the second charge capacitor to output a second triangular waveform signal;

a second Schmitt trigger circuit that receives an input of the second triangular waveform signal obtained at an output terminal of the second charge capacitor and generates a rectangular waveform signal with a predetermined threshold value; and a second latch circuit composed of an R-S NOR latch that uses two 2-input NOR elements that receive inputs of the rectangular waveform signal from the second Schmitt trigger circuit and a signal that is formed by an inverter through inverting the frequency-divided signal from the frequency-divided signal input terminal, respectively, wherein outputs of the NOR elements are mutually returned to the other and outputted as a second PWM signal.

8. A power supply circuit, comprising:
a DC-DC conversion means for controlling an upper transistor and a lower transistor with a plurality of PWM signals, and generating a PWM-controlled DC output voltage,
wherein the upper transistor and the lower transistor are serially connected between a power supply voltage and a reference potential;
error detection means for comparing the PWM-controlled DC output voltage with a reference voltage and outputting an error amount; and
a plurality of circuit means for generating the plurality of PWM signals that are used to perform PWM control for the DO-DC conversion means,
wherein the circuit means comprise means for receiving an error signal from the error detection means and generating the PWM signals using potential judging circuits that are mutually shifted by a half cycle and
wherein the PWM signals have a duty in a range of 0–100% according to the error output of the error detection means.

9. A power supply circuit according to claim 8, wherein the plurality of circuit means for generating, comprises:
first means for:
receiving the error signal from the error detection means,
generating first and second triangular waveform signals, using first and second clocks having a predetermined frequency which are mutually shifted by a half cycle, that have amplitudes according to the error signal and are mutually shifted by a half cycle, and
generating first and second PWM signals, using first and second potential judging circuits, that are mutually shifted by a half cycle;
second means for:
receiving an error signal from the error detection means,
generating first and second triangular waveform signals, using first and second clocks having a predetermined frequency which are mutually shifted by a half cycle, that have amplitudes according to the error signal and are mutually shifted by a half cycle, and
generating first and second PWM signals, using first and second potential judging circuits, that are mutually shifted by a half cycle; and
means for mixing the first and second PWM signals from the first means and the second means, and outputting a PWM signal having a frequency that is two times the predetermined frequency.

10. A power supply circuit according to claim 9, wherein the first means, comprises:
a first input comprising a frequency-divided signal with a 50% duty which is generated based on a main reference clock having a predetermined frequency;
a second input comprising a first frequency-divided clock, wherein the first frequency-divided clock and a second frequency-divided clock are generated by dividing the main reference clock into two parts which are mutually shifted by a half cycle;
a third input comprising an input voltage as a power supply voltage;
a fourth input comprising an error output from the error detection means;
a fifth input comprising a reference potential;
a first voltage-current conversion circuit including a first error amplifier, a first reference resistance and a first current control P-channel transistor,
wherein the error output is inputted in a minus (−) terminal of the first error amplifier,
wherein a plus (+) terminal of the first error amplifier is connected to a serial connection point between a drain of the first current control P-channel transistor and the first reference resistance,
wherein an output terminal of the first error amplifier is connected to a gate of the first current control P-channel transistor,
wherein a source of the first current control P-channel transistor is connected to the third input, and the first reference resistance is connected to the fifth input;
a first charge-discharge circuit including a first current supply P-channel transistor, a first charge capacitor and a first discharge N-channel transistor,
wherein a source of the first current supply P-channel transistor is connected to the third input and a drain thereof is connected through the first charge capacitor to the fifth input, wherein a drain and a source of the first discharge N-channel transistor are connected in parallel to both ends of the first charge capacitor, wherein a gate of the first current supply P-channel transistor is connected to the gate of the first current control P-channel transistor and the output terminal of the first error amplifier, wherein a gate of the first discharge N-channel transistor is connected to the first clock input terminal, and the first discharge N-channel transistor is periodically turned on by the first frequency-divided clock that is supplied to the gate thereof to output a first triangular waveform signal;

a first Schmitt trigger circuit that receives the first triangular waveform signal and generates a rectangular waveform signal with a predetermined threshold value; and a first latch circuit comprising an R-S NOR latch that includes two 2-input NOR elements that receive the rectangular waveform signal and the first input, respectively, wherein outputs of the NOR elements are mutually returned to the other and output as a first PWM signal.

11. A power supply circuit according to claim 10, wherein the second means, comprises:

the first input, the third input, the fourth input, the fifth input;

a sixth input comprising a second frequency-divided clock, wherein the first frequency-divided clock and a second frequency-divided clock are generated by dividing the main reference clock into two parts which are mutually shifted by a half cycle;

a second voltage-current conversion circuit including a second error amplifier, a second reference resistance and a second current control P-channel transistor, wherein the error output is inputted in a minus (−) terminal of the second error amplifier, wherein a plus (+) terminal of the second error amplifier is connected to a serial connection point between a drain of the second current control P-channel transistor and the second reference resistance, wherein an output terminal of the second error amplifier is connected to a gate of the second current control P-channel transistor, wherein a source of the second current control P-channel transistor is connected to the third input, and the second reference resistance is connected to the fifth input;

a second charge-discharge circuit including a second current supply P-channel transistor, a second charge capacitor and a second discharge N-channel transistor, wherein a source of the second current supply P-channel transistor is connected to the third input and a drain thereof is connected through the second charge capacitor to the fifth input, wherein a drain and a source of the second discharge N-channel transistor are connected in parallel to both ends of the second charge capacitor, wherein a gate of the second current supply P-channel transistor is connected to the gate of the second current control P-channel transistor and the output terminal of the second error amplifier, wherein a gate of the second discharge N-channel transistor is connected to the second clock input terminal, and the second discharge N-channel transistor is periodically turned on by the second frequency-divided clock that is supplied to the gate thereof to output a second triangular waveform signal;

a second Schmitt trigger circuit that receives the second triangular waveform signal and generates a rectangular waveform signal with a predetermined threshold value; and a second latch circuit comprising an R-S NOR latch including two 2-input NOR elements that receive the rectangular waveform signal and a signal generated by inverting the frequency-divided signal from the first input, respectively, wherein outputs of the NOR elements are mutually returned to the other and output as a second PWM signal.

12. A PWM circuit, comprising:

first means for:

receiving an error signal from the error detection means, generating first and second triangular waveform signals, using first and second clocks having a predetermined frequency which are mutually shifted by a half cycle, that have amplitudes according to the error signal and are mutually shifted by a half cycle, and generating first and second PWM signals, using first and second potential judging circuits, that are mutually shifted by a half cycle;

second means for:

receiving an error signal from the error detection means, generating first and second triangular waveform signals, using first and second clocks having a predetermined frequency which are mutually shifted by a half cycle, that have amplitudes according to the error signal and are mutually shifted by a half cycle, and generating first and second PWM signals, using first and second potential judging circuits, that are mutually shifted by a half cycle; and means for mixing the first and second PWM signals from the first means and the second means, and outputting a PWM signal having a frequency that is two times the predetermined frequency.

13. A power supply circuit according to claim 12, wherein the first means, comprises:

a first input comprising a frequency-divided signal with a 50% duty which is generated based on a main reference clock having a predetermined frequency;

a second input comprising a first frequency-divided clock, wherein the first frequency-divided clock and a second frequency-divided clock are generated by dividing the main reference clock into two parts which are mutually shifted by a half cycle;

a third input comprising an input voltage as a power supply voltage;

a fourth input comprising an error output from the error detection means;

a fifth input comprising a reference potential;

a first voltage-current conversion circuit including a first error amplifier, a first reference resistance and a first current control P-channel transistor, wherein the error output is inputted in a minus (−) terminal of the first error amplifier, wherein a plus (+) terminal of the first error amplifier is connected to a serial connection point between a drain of the first current control P-channel transistor and the first reference resistance, wherein an output terminal of the first error amplifier is connected to a gate of the first current control P-channel transistor, wherein a source of the first current control P-channel transistor is connected to the third input, and the first reference resistance is connected to the fifth input;

a first charge-discharge circuit including a first current supply P-channel transistor, a first charge capacitor and a first discharge N-channel transistor, wherein a source of the first current supply P-channel transistor is connected to the third input and a drain thereof is connected through the first charge capacitor to the fifth input, wherein a drain and a source of the first discharge N-channel transistor are connected in parallel to both ends of the first charge capacitor, wherein a gate of the first current supply P-channel transistor is connected to the gate of the first current control P-channel transistor and the output terminal of the first error amplifier, wherein a gate of the first discharge N-channel transistor is connected to the first clock input terminal, and the first discharge N-channel transistor is periodically turned on by the first frequency-divided clock that is supplied to the gate thereof to output a first triangular waveform signal;

a first Schmitt trigger circuit that receives the first triangular waveform signal and generates a rectangular waveform signal with a predetermined threshold value; and a first latch circuit comprising an R-S NOR latch that includes two 2-input NOR elements that receive the rectangular waveform signal and the first input, respectively, wherein outputs of the NOR elements are mutually returned to the other and output as a first PWM signal.

14. A power supply circuit according to claim 13, wherein the second means, comprises:

the first input, the third input, the fourth input, the fifth input;

a sixth input comprising a second frequency-divided clock, wherein the first frequency-divided clock and a second frequency-divided clock are generated by dividing the main reference clock into two parts which are mutually shifted by a half cycle;

a second voltage-current conversion circuit including a second error amplifier, a second reference resistance and a second current control P-channel transistor, wherein the error output is inputted in a minus (−) terminal of the second error amplifier, wherein a plus (+) terminal of the second error amplifier is connected to a serial connection point between a drain of the second current control P-channel transistor and the second reference resistance, wherein an output terminal of the second error amplifier is connected to a gate of the second current control P-channel transistor, wherein a source of the second current control P-channel transistor is connected to the third input, and the second reference resistance is connected to the fifth input;

a second charge-discharge circuit including a second current supply P-channel transistor, a second charge capacitor and a second discharge N-channel transistor, wherein a source of the second current supply P-channel transistor is connected to the third input and a drain thereof is connected through the second charge capacitor to the fifth input, wherein a drain and a source of the second discharge N-channel transistor are connected in parallel to both ends of the second charge capacitor, wherein a gate of the second current supply P-channel transistor is connected to the gate of the second current control P-channel transistor and the output terminal of the second error amplifier, wherein a gate of the second discharge N-channel transistor is connected to the second clock input terminal, and the second discharge N-channel transistor is periodically turned on by the second frequency-divided clock that is supplied to the gate thereof to output a second triangular waveform signal;

a second Schmitt trigger circuit that receives the second triangular waveform signal and generates a rectangular waveform signal with a predetermined threshold value; and a second latch circuit comprising an R-S NOR latch including two 2-input NOR elements that receive the rectangular waveform signal and a signal generated by inverting the frequency-divided signal from the first input, respectively, wherein outputs of the NOR elements are mutually returned to the other and output as a second PWM signal.

15. A method for performing PWM control in a power supply circuit, comprising:

controlling an upper transistor and a lower transistor with a plurality of PWM signals, wherein the upper transistor and the lower transistor are serially connected between a power supply voltage and a reference potential;

generating a PWM-controlled DC output voltage;

comparing the PWM-controlled DC output voltage with a reference voltage;

outputting an error amount; and generating the plurality of PWM signals that are used to perform PWM control for the DC-DC conversion means, receiving an error signal and generating the PWM signals that are mutually shifted by a half cycle, and wherein the plurality of PWM signals have a duty in a range of 0–100% according to the error output of the error detection means.

16. A method according to claim 15, wherein generating the plurality of PWM signals, comprises:

(a) receiving the error signal;

(b) generating first and second triangular waveform signals, using first and second clocks having a predetermined frequency which are mutually shifted by a half cycle, that have amplitudes according to the error signal and are mutually shifted by a half cycle, and (c) generating first and second PWM signals that are mutually shifted by a half cycle;

(d) receiving the error signal from the error detection means, (e) generating first and second triangular waveform signals, using first and second clocks having a predetermined frequency which are mutually shifted by a half cycle, that have amplitudes according to the error signal and are mutually shifted by a half cycle;

(f) generating first and second PWM signals that are mutually shifted by a half cycle;

(g) mixing the first and second PWM signals from steps (c) and (f); and (h) outputting a PWM signal having a frequency that is two times the predetermined frequency.

17. A method of generating a PWM signal, comprising:
(a) receiving an error signal;
(b) generating first and second triangular waveform signals, using first and second clocks having a predetermined frequency which are mutually shifted by a half cycle, that have amplitudes according to the error signal and are mutually shifted by a half cycle; and
(c) generating first and second PWM signals that are mutually shifted by a half cycle;
(d) receiving an error signal;
(e) generating first and second triangular waveform signals, using first and second clocks having a predetermined frequency which are mutually shifted by a half cycle, that have amplitudes according to the error signal and are mutually shifted by a half cycle;
(f) generating first and second PWM signals that are mutually shifted by a half cycle;
(h) mixing the first and second PWM signals from step (c) and step (f); and
(i) outputting the PWM signal having a frequency that is two times the predetermined frequency.

* * * * *